United States Patent [19]

Wells

[11] 4,299,805
[45] Nov. 10, 1981

[54] REGENERATION OF CARBON EMPLOYED IN THE WET PROCESS PRODUCTION OF PHOSPHORIC ACID

[75] Inventor: Bruce D. Wells, Pittsburgh, Pa.

[73] Assignee: Calgon Corporation, Pittsburgh, Pa.

[21] Appl. No.: 68,316

[22] Filed: Aug. 21, 1979

Related U.S. Application Data

[63] Continuation of Ser. No. 892,043, Mar. 30, 1978, abandoned.

[51] Int. Cl.³ .............................................. C01B 25/16
[52] U.S. Cl. ................................ 423/321 R; 252/412
[58] Field of Search .................. 423/321 S, 32 R, 460, 423/461; 252/412, 413, 444

[56] References Cited

U.S. PATENT DOCUMENTS 3,720,626  3/1973  Benzaria et al. ..................... 252/412
3,944,513  3/1976  Greenwald et al. ................. 423/461

FOREIGN PATENT DOCUMENTS 1290665  3/1962  France ................................ 252/413
1103224  2/1968  United Kingdom ............ 423/321 R Primary Examiner—O. R. Vertiz
Assistant Examiner—Gregory A. Heller
Attorney, Agent, or Firm—Martin L. Katz; Edmunde D. Riedl; R. Brent Olson

[57] ABSTRACT

In a process for regenerating the activated carbon and in the purification of brown phosphoric acid or alkali phosphates obtained via the so-called wet process employing mineral acid digestion of crushed phosphate rock, the activated carbon used to filter brown $H_3PO_4$ is removed from service, washed with water, the initial washings being recovered to reclaim phosphoric acid, and then steeped in a basic aqueous solution, e.g., aqueous alkali hydroxide, alkali carbonate, ammonium hydroxide, loweralkyl amines or loweralkanol amines. After again water washing the activated carbon, to remove residual base, the activated carbon is either returned to service or steeped in an aqueous solution of mineral acid, e.g., sulfuric, hydrochloric, or nitric acid, again washed with water to remove residual acid and returned to service. Usually, the acid steep need not be employed with every base cycle to maintain good decolorization, although if desired the acid steep can be used with each caustic cycle.

14 Claims, 2 Drawing Figures

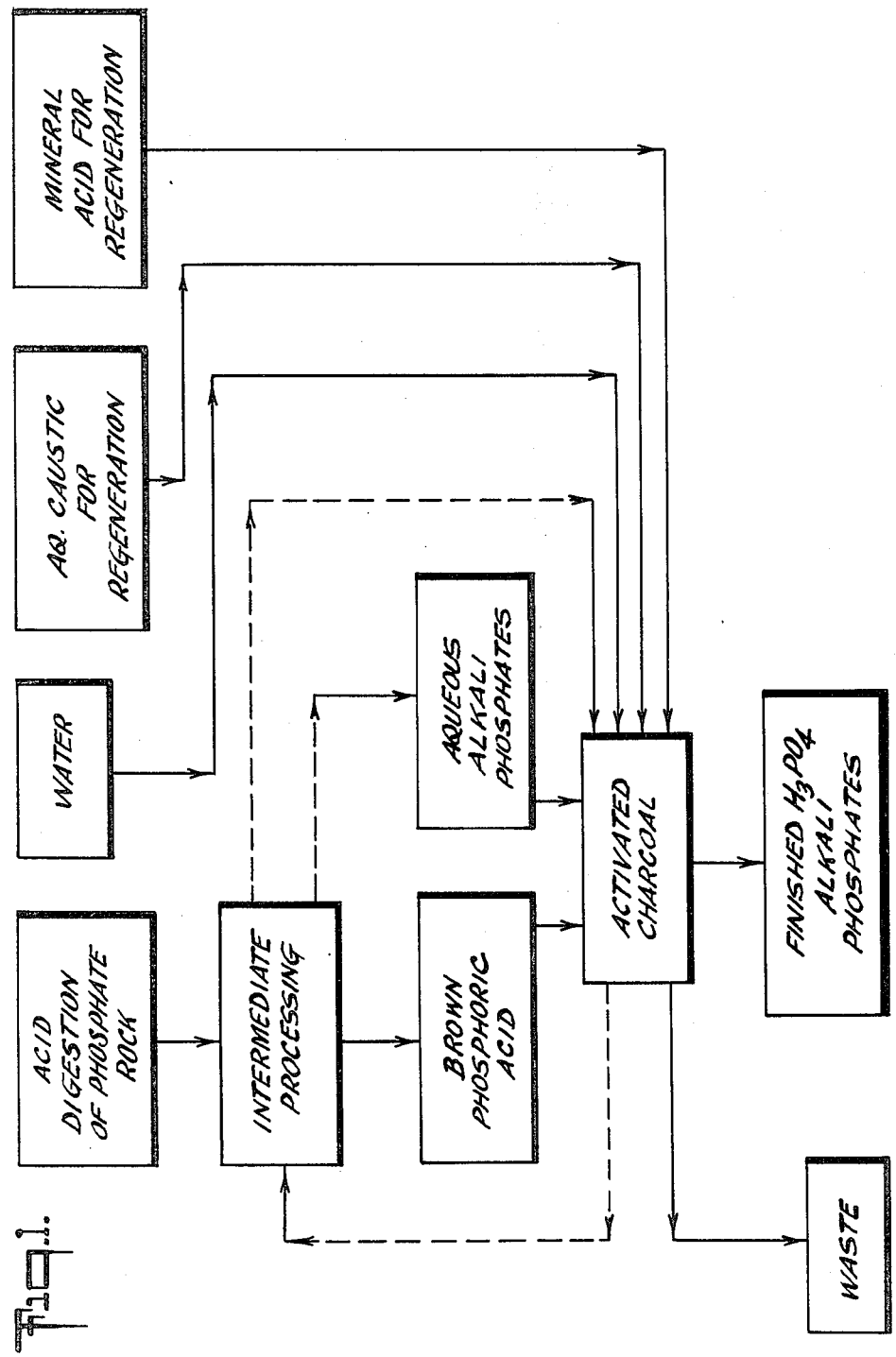

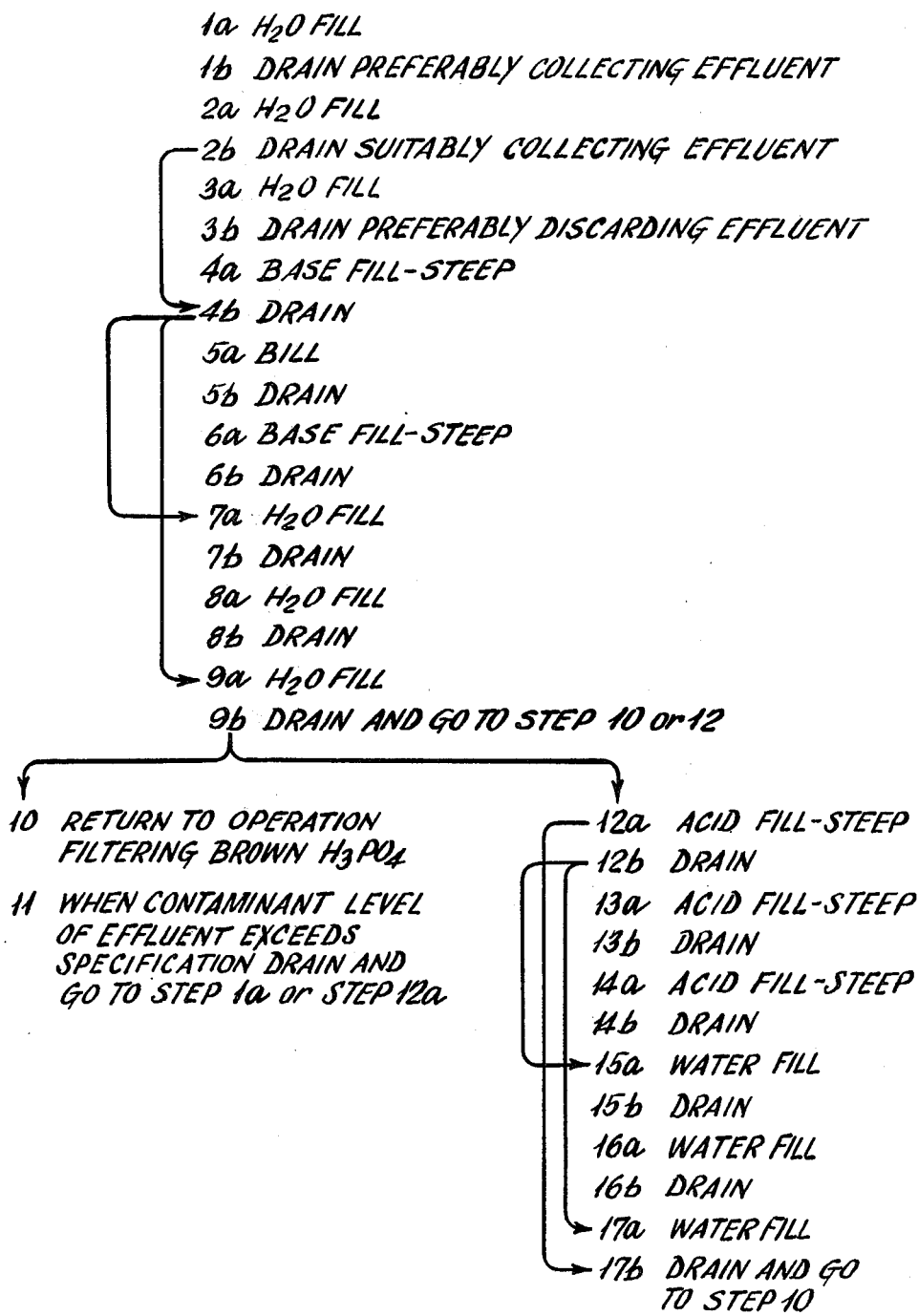

REGENERATION OF CARBON EMPLOYED IN THE WET PROCESS PRODUCTION OF PHOSPHORIC ACID

This is a continuation of application Ser. No. 892,043, filed Mar. 30, 1978, now abandoned.

DISCLOSURE OF THE INVENTION

This invention relates to an improved process for recycling and regenerating activated carbon employed in the purification of phosphoric acid produced by the wet-process.

BACKGROUND OF THE INVENTION

In the past food and pharmaceutical grade phosphoric acid or alkali metal phosphates including, for example, trisodium phosphate, sodium tripolyphosphate, tetrasodium pyrophosphate and disodium phosphate were prepared by the thermal acid method described in Slack, Phosphoric Acid, V. 1, pp. 927–966, Marcel Dekker, Inc. (1968). The phosphoric acid and phosphates used in food, pharmaceuticals and in the processing of foods and pharmaceuticals must within stringent limits be substantially free from arsenic, fluorides, heavy metals and general contaminants referred to as insolubles.

The thermal process for producing food and pharmaceutical grade phosphoric acid produces extremely pure phosphoric acid, but requires extensive capital investment for equipment, a large input of energy and pollution control equipment. Until recently, the inability to confidently remove contaminants made electrothermal phosphoric acid prepared from elemental phosphorous the predominant source of pure phosphoric acid.

The so-called wet process employing phosphate rock and sulfuric acid is well known in the art and described in Waggamen Phosphoric Acid, Phosphates and Phosphatic Fertilizer, pp 174–209, Hafner Publishing Co. (2nd Ed., 1969). The wet process is also broad enough to include acids other than sulfuric, including nitric and hydrochloric acid. This is described in Slack, Phosphoric Acid, V. 1, Part 2, pp. 889–926, Marcel Dekker, Inc. (1968).

Many processes were proposed to remove the contaminants found in wet process phosphoric acid and substantially all the successful processes employ activated carbon. For example, see U.S. Pat. No. 3,993,733; U.S. Pat. No. 3,872,215; U.S. Pat. No. 3,993,736; U.S. Pat. No. 3,122,415; and British Pat. No. 1,442,919. Unfortunately, the phosphate rock impurities deactivate the porous activated carbon and because sufficient of these impurities are inorganic, thermal regeneration of the activated carbon is unsuitable because phosphate glasses fuse to the pores of the activated carbon. Since the use of activated carbon was the key to so many successful processes for upgrading wet process phosphoric acid, however, some means to increase the life of the too quickly exhausted activated carbon was necessary, since mere disposal after only limited use is clearly economically unsatisfactory. Attempts were made to backwash the activated carbon with poor results. Washing with caustic as in British Pat. No. 1,103,224 at first seemed a satisfactory solution, but the activated carbon never returns to more than 90% of the immediately previous cycles capacity, so after four regenerations the capacity is reduced to about 66% of the virgin activated carbon and after ten regeneration cycles with caustic alone, the carbon is substantially exhausted.

Clearly, unless inordinate quantities of activated carbon are to be employed a more efficient regeneration means is required to not only save the capital cost and operating of renewing the activated carbon, but also the labor employed in replacement.

The process of this invention returns the activated carbon to a condition equivalent to its virgin capacity, it achieves the results required to make wet process phosphoric acid the equivalent of thermal elemental phosphoric acid, since processes using activated carbon now become commercially feasible.

In the drawing

FIG. 1 shows a flow chart setting forth a process of this invention; and

FIG. 2 shows a sequential diagram for practicing the process of this invention.

DETAILED DESCRIPTION OF THE INVENTION

The nature and content of the impurities that poison the activated charcoal and necessitate its regeneration are only partially understood. They mostly comprise gypsum that continues to precipitate from the brown phosphoric acid, earth waxes, and humic acids together with heavy metal salts, for example, arsenic, lead and the like as well as fluoride salts and complex silicates. Indeed, the exact nature of the contaminants is difficult to state with precision since the composition of the raw phosphate rock will differ with the run of the mine and even more widely from mine to mine. Also, the sulfer employed to produce the sulfuric acid will itself contain various impurities that carry over to poison, clog or otherwise exhaust the activated carbon. In addition, the wearing of the crushing surfaces of processing equipment employed to pulverize the rock can also introduce impurities that appear in the brown acid. Thus, it is all the more remarkable that the process of this invention is useful in regenerating activated carbon containing such a varied mix of contaminants.

In the production of brown acid, phosphate containing rock usually predominantly calcium phosphate is pulverized and digested with mineral acid. The rock material is a mixture of overburden, and organic material running through the veins. Generally, in the digestion sulfuric acid is employed which produces large quantities of calcium sulfate. This slowly precipitates as gypsum. Other mineral acids are suitable and on some occasions employed in the production of phosphoric acid. These other mineral acids also produce contaminants and physical deposits similar to those found in the process when sulfuric acid is employed, except of course, gypsum is for the most part absent. Since the principles of the regeneration process of this invention are independent of the acid employed, the process will be exemplified by means of the sulfuric wet process.

Referring to the flow chart, as shown in FIG. 1 the raw brown acid that usually comes from the wet process digestion is about 28% to 34% by weight (expressed in $P_2O_5$ content). The brown acid is usually put through a seperation step to remove gross particles of gypsum and often a solids contact unit clarifyer to further remove residual solids. This intermediate processing can also be employed to neutralize the crude phosphoric acid to alkali metal phosphates.

At this point, many producers employ one or more activated carbon purification steps. In the purification, the brown phosphoric acid is by gravity or by pressure filtered through a bed or column of activated carbon. The activated carbon employed can be derived from bituminous coal, lignite, peat, coconut shells, from wood sources or from petroleum acid sludge, or coke and need not have any particular pore size or mesh size. Generally, the so-called liquid phase activated carbons are preferred since their pore size distribution is sufficiently large to allow for easy access of liquids to the interior of the pores. The gas phase activated carbons are suitable but require a slightly longer residence time of the material to be purified. The more preferred activated carbons are granular and have a total surface area of 500-1200 $m^2/g$. One such carbon is sold as SGL Granular Carbon.

In most cases, a residence time of from $\frac{1}{3}$-3 hours in the activated carbon is satisfactory, while $1\frac{1}{2}$ hours is most desirable. When the existing phosphoric acid is no longer green, but starts to take on a brown tinge or if such a lengthy residence time is required that production is hampered or color specifications are exceeded, it is time to regenerate the carbon.

In its broadest aspects, the invention entails intermittant washing of the activated carbon with aqueous base and aqueous mineral acid. This acid-base treatment can be sequential or the activated carbon can be employed to filter phosphoric acid between treatment with either acid or base. Further, the relative sequence of acid to base is incidental.

The regeneration of the activated carbon is, however, preferably performed in accordance with the steps 1-17 set forth in FIG. 2. In the preferred process, the column or bed of activated carbon is drained of its contents and refilled with whatever solution is dictated by the next step, and that solution allowed to steep in the column or bed of activated carbon for the specified time usually from 1-10 hours, before proceeding to the next step. If plant conditions dictate it is, however, suitable to practice continuous influx and outflow, during all steps. If this continuous flushing is practical rather than the "drain-fill steep" preferred embodiment the contact time of water, base and acid, should be adjusted accordingly so they are equivalent to the residence time set forth in the preferred embodiment.

It should be noted that a number of steps in the preferred process can suitably be eliminated without undue detriment to the activated carbon. These eliminated steps are indicated by the marginal arrows for example from step 2b to step 9a. Otherwise, it is generally preferred to follow the steps in sequence.

Proceeding from step 11, when the green acid produced starts to show more than the desired level of contamination, the activated carbon bed or column is removed from service drained and filled with water as in step 1a. After a contact time of from $\frac{1}{4}$ to about 4 hours, the column or bed is drained, step 1b, preferably collecting the effluent which is enriched in phosphoric acid. This water washing sequence is repeated as in steps 2a through 3b. As already stated a continuous flow water wash is nearly as satisfactory. What is desired is that the bulk of residual phosphoric acid is flushed from the activated carbon so that neutralization producing excess salts that could deteriorate the activated carbon does not occur when the caustic solution is employed.

Then in step 4a, the activated carbon bed or column is loaded with a 1% to 50% by weight aqueous solution of base. By the term "base" it is meant a substance that in aqueous solution induces a pH of 8 and preferably 10. Suitable bases include alkali hydroxides, alkali carbonates, ammonia, lower alkyl amines and lower alkanol amines. The preferred base is sodium hydroxide. This solution is allowed to remain in the bed or column for from $\frac{1}{4}$ to 10 hours. The base solution is then drained from the bed or column. This can be repeated one or more times, but is not absolutely required.

Again, a continuous flow for $\frac{1}{4}$ to 10 hours such as in a trickle bed is satisfactory, but the steeping is preferred. The caustic is then rinsed from the bed or column as in step 7a in the same manner as in steps 1-3. While, one water wash is sufficient, it is preferred at least three water washings be employed.

At this point, the bed or column can be either returned to operation step 10 or treated with the acid as in step 12 and as set forth below in detail. If returned to operation, the cycle steps 1-11 are repeated from 1 to 8 additional times or until the specification for the phosphoric acid shows by photometry colorimetry or other analytical means that excessive impurities are present in the green phosphoric acid. At that point, the activated carbon bed or column is then treated with acid subsequent to the water rinse following the caustic steep. The column or bed is filled with from 0.5 to 2 N aqueous mineral acid such as sulfuric, hydrochloric, or nitric acid although sulfuric acid is preferred. This solution is allowed to steep in the carbon bed or column for from $\frac{1}{2}$ to 16 hours. A single fill without draining and refilling is generally preferred but a twice or thrice repeated draining and refilling is suitable, but not found to be necessary in most cases. The acid steep as all other operations in steps 1-17 is preferably conducted at ambient temperature, but temperatures from 20° C. to 60° C. are suitable. When the temperature exceeds 25° C. the time to conduct the regeneration is shortened proportionately and from 1-4 hours is in most cases found sufficient.

The exact time period, of course, must be determined by some experimentation because of the wide variation in the chemical composition of phosphate rock raw material. After completing steps 12b, 13b or 14b where the spent acid is conveniently channeled to the rock digestion process, the activated carbon is preferably water washed as in steps 1-3 or by continuous flow as previously described. The water wash can be eliminated but this is not at all recommended since the green phosphoric acid becomes contaminated with sulfuric acid. This may, however, be satisfactory when fertilizer grade phosphoric acid is contemplated.

The activated carbon obtained from the process of this invention after the caustic-rinse acid-rinse cycle steps 1-17 is novel in that it comprises an activated carbon having a surprisingly low ash, generally less than 1% as indicated by ASTM D-2866-70. The novel activated carbon is also characterized in that the size range of the activated carbon particles is substantially uniform and is within a range of 10-20 mesh U.S. Standard. This carbon being so uniquely low in ash and of a substantially uniform size is particularly suitable for operations where such properties are desirable as in the filtration of pharmaceutical products or intermediates.

In the attached flow sheet, as shown in FIG. 1 the solid lines indicate the most usual pathway in the production of wet process phosphoric acid. The dashed lines indicate optional pathways which may be employed by various users of the wet process without departing from the spirit or scope of this invention.

What is claimed is:

1. In the process of producing phosphoric acid by treatment with activated carbon to remove impurities from brown phosphoric acid and regenerating the activated carbon, the improvement which comprises regeneration of the activated carbon employed in the filtration of brown phosphoric acid comprising the steps of water washing the activated carbon to remove residual brown phosphoric acid; contacting the activated carbon with an aqueous solution of a base where the solution is from about 1% to 50% by weight in said base at a temperature of from 20° C. to 60° C. for a period of from 1–10 hours; washing the activated carbon with water to remove residual base; contacting the activated carbon with an aqueous solution of 0.5 to 2 N mineral acid other than brown phosphoric acid at a temperature of from 20° C. to 60° C. for a period of 1–16 hours; removing the mineral acid from the activated carbon and resuming filtration of brown phosphoric acid.

2. In the process of producing phosphoric acid by treatment with activated carbon to remove impurities, from brown phosphoric acid and regenerating the activated carbon the improvement which comprises regeneration of the activated carbon employed in the filtration of brown phosphoric acid comprising the steps of water washing the activated carbon to remove residual brown phosphoric acid; contacting the activated carbon with an aqueous solution of alkali hydroxide where the solution is from about 1% to 50% by weight alkali hydroxide at a temperature of from 20° C. to 60° C. for a period of from 1–10 hours; washing the activated carbon with water to remove residual alkali hydroxide; contacting the activated carbon with an aqueous solution of 0.5 to 2 N mineral acid other than brown phosphoric acid at a temperature of from 20° C. to 60° C. for a period of 1–16 hours; removing the mineral acid from the activated carbon and resuming filtration of brown phosphoric acid.

3. A process according to claim 2 where the mineral acid is sulfuric acid.

4. A process according to claim 2 where the activated carbon is granular.

5. A process according to claim 2 where alkali hydroxide is sodium hydroxide.

6. A process according to claim 2 where the alkali hydroxide solution contacts the activated carbon by continuous flow means.

7. A process according to claim 2 where the alkali hydroxide solution contacting the activated carbon is non-flowing and static and the activated carbon steeps in said solution.

8. A process according to claim 7 where the activated carbon is steeped in at least two sequential batches of alkali hydroxide solution.

9. A process according to claim 2 where the mineral acid solution contacts the activated carbon by continuous flow.

10. A process according to claim 2 where the aqueous acid solution contacting the activated carbon is non-flowing and static, and the activated carbon is thereby steeped in said solution.

11. A process according to claim 10 where the activated carbon is steeped in at least two sequential batches of the acid solution.

12. A process according to claim 2 where the water washes are performed batchwise.

13. A process according to claim 2 where the activated carbon is washed with water subsequent to the removal of the mineral acid.

14. A process according to claim 2 where subsequent to removal of residual alkali hydroxide solution the brown phosphoric acid is filtered through said carbon until its capacity is exhausted, and the activated carbon is washed and treated with the alkali hydroxide.

* * * * *